US009581725B2

(12) United States Patent
Davis

(10) Patent No.: US 9,581,725 B2
(45) Date of Patent: Feb. 28, 2017

(54) EVALUATING SURFACE DATA

(71) Applicant: Halliburton Energy Services, Inc., Houston, TX (US)

(72) Inventor: Eric J. Davis, El Cerrito, CA (US)

(73) Assignee: Halliburton Energy Services, Inc., Houston, TX (US)

(*) Notice: Subject to any disclaimer, the term of this patent is extended or adjusted under 35 U.S.C. 154(b) by 455 days.

(21) Appl. No.: 14/220,754

(22) Filed: Mar. 20, 2014

(65) Prior Publication Data

US 2014/0207381 A1 Jul. 24, 2014

Related U.S. Application Data

(62) Division of application No. 12/956,609, filed on Nov. 30, 2010, now Pat. No. 8,718,940.

(51) Int. Cl.
*G01V 3/38* (2006.01)
*G01V 3/00* (2006.01)
(Continued)

(52) U.S. Cl.
CPC .............. *G01V 99/00* (2013.01); *G01S 13/88* (2013.01); *G01V 99/005* (2013.01); *G06F 17/30241* (2013.01)

(58) Field of Classification Search
CPC .. G01V 99/00; G01V 99/005; G01V 2210/64; G01V 2210/66; G01V 1/302;
(Continued)

(56) References Cited

U.S. PATENT DOCUMENTS 6,985,816 B2 1/2006 Sorrells et al.
7,028,772 B2 4/2006 Wright et al.
(Continued)

FOREIGN PATENT DOCUMENTS

WO WO2012/072976 A2 6/2012

OTHER PUBLICATIONS

Lo et al., "Concepts and Techniques of Geographic Information Systems", Prentice Hall, ISBN: 0-13-080427-4, pp. 306-309, 313, 328-331, Jan. 1, 2002.
Notification of first Office Action and Examination Search Report issued by the Canadian Patent Office for Canadian Patent Application No. 2,818,965 mailed Jan. 7, 2015; 3 pages.
Tonini et al., "3D Geo-Mapping Based on Surface Data for Preliminary Study of Underground Works: A Case Study in Val Topina (Central Italy)", Engineering Geology 99, Published in 2008, pp. 61-69.
(Continued)

*Primary Examiner* — An Do
(74) *Attorney, Agent, or Firm* — John W. Wustenberg; Parker Justiss, P.C.

(57) ABSTRACT

Systems, methods, and instructions encoded in a computer-readable medium can perform operations related to evaluating surface data. Geodetic data for a plurality of surface locations are received. The geodetic data may include surface gradient information and/or surface elevation information for multiple surface locations. A set of constraining relationships is generated based on the geodetic data. The set of constraining relationships relates undetermined values of surface elevation movement and/or undetermined values of surface gradient movement to measured surface elevation changes and/or measured surface gradient changes. Some or all of the constraining relationships include multiple undetermined values. Particular values for surface elevation movements and/or particular values for surface gradient movements are calculated for multiple surface locations based on determining a solution to the set of constraining relationships. In some implementations, a minimum curvature surface may be generated deterministically based on the geodetic data and the particular values identified using the constraining relationships.

8 Claims, 7 Drawing Sheets

(51) Int. Cl.
  *G01V 99/00* (2009.01)
  *G06F 17/30* (2006.01)
  *G01S 13/88* (2006.01)
(58) Field of Classification Search
  CPC ........... G06F 17/30241; G06F 17/5009; G01S 13/88; G01R 31/025
  USPC ....................................... 702/2, 5; 703/2, 10
  See application file for complete search history.

(56) References Cited

U.S. PATENT DOCUMENTS

| | | |
|---|---|---|
| 7,660,194 B2 | 2/2010 | Uhl et al. |
| 7,711,532 B2 | 5/2010 | Dulac et al. |
| 7,768,441 B2 | 8/2010 | Davis et al. |
| 8,600,708 B1 * | 12/2013 | Mallet ..................... G06T 17/05 703/2 |
| 2006/0023567 A1 | 2/2006 | Uhl et al. |
| 2006/0081412 A1 | 4/2006 | Wright et al. |
| 2009/0237297 A1 | 9/2009 | Davis et al. |
| 2009/0271115 A1 | 10/2009 | Davis et al. |

OTHER PUBLICATIONS

Colombian Resolution Report No. 67275, Nov. 12, 2014, 6 pages, including English language summary.
Notification of Transmittal of the International Search Report and the Written Opinion of the International Searching Authority, or Declaration (1 page); International Search Report (2 pages); and Written Opinion of the International Searching Authority (7 pages), mailed Jun. 21, 2012, for related international application PCT/GB2011/001661.
International Preliminary Report on Patentability in International Application No. PCT/GB2011/001661, mailed Jun. 13, 2013, 7 pages.
Davis, E., et al., "Precise Deformation Monitoring by High Resolution Tiltmeters," SEGJ presented at the 2001 Conference and published Jan. 2002 in the Butsuri-Tansa, vol. 54, No. 6, pp. 425-432 (9 pages).
Zhang, X., "An Algorithm for Calculating Water Surface Elevations from Surface Gradient Image Data" Experiments in Fluids, vol. 21, No. 1, pp. 43-48, May 1996 (6 pages).
C.P. Lo et al., "Concepts and Techniques of Geographic Information Systems Passage" XP-002677105, Jan. 1, 2002, pp. 306-309, 313, 328-331.

\* cited by examiner

EVALUATING SURFACE DATA

This Application is a Divisional Application of and claims the benefit of priority to U.S. patent application Ser. No. 12/956,609, filed on Nov. 30, 2010 and entitled "Evaluating Surface Data", the contents of which are hereby incorporated by reference.

BACKGROUND

The present disclosure relates to evaluating surface data.

Geodetic measurements provide information about the Earth's surface. For example, Global Positioning System (GPS) measurements can provide three-dimensional coordinates (e.g., longitude, latitude, and elevation) for locations on the Earth's surface, Interferometric Synthetic Aperture Radar (InSAR) can provide change in position data for locations on the Earth's surface, and tiltmeter measurements can provide tilt data (e.g., indicating change in elevation gradient) for locations on the Earth's surface. In some instances, geodetic measurements over time can be used to detect temporal changes in the Earth's surface. Analyzing temporal changes in the Earth's surface may provide information about subterranean structures, resources, and events occurring beneath the Earth's surface.

SUMMARY

This specification describes technologies relating to evaluating surface data.

In a general aspect, geodetic data are used to identify temporal changes in surface elevations and/or surface gradients. In some instances, the identified changes in surface elevation and/or the identified changes in surface gradient may be used with the geodetic data to generate a surface deformation model of a geographic region.

In some aspects, methods, systems, apparatus, and computer programs encoded on computer storage devices are configured to perform operations for evaluating surface data. Geodetic data for a plurality of surface locations are received. The geodetic data may include surface gradient information and/or surface elevation information for multiple surface locations. A set of constraining relationships is generated based on the geodetic data. The set of constraining relationships relates undetermined values of surface elevation movement and/or undetermined values of surface gradient movement to measured surface elevation changes and/or measured surface gradient changes. Some or all of the constraining relationships include multiple undetermined values. Particular values for surface elevation movements and/or particular values for surface gradient movements are calculated for multiple surface locations based on determining a solution to the set of constraining relationships. In some implementations, a minimum curvature surface may be generated deterministically based on the geodetic data and the particular values identified using the constraining relationships.

Implementations may include one or more of the following features. The geodetic data include surface elevation information for a first subset of the surface locations and surface gradient information for a second subset of the surface locations. The set of constraining relationships relates undetermined values for temporal changes in surface gradients at the first subset of surface locations and undetermined values for temporal changes in surface elevations at the second subset of surface locations to the surface elevation information and the surface gradient information included in the geodetic data. Identifying particular values for temporal changes in surface elevation at each surface location in the subset includes identifying particular values for temporal changes in surface gradient at each of the first subset of locations and particular values for temporal changes in surface elevation at each of the second subset of surface locations. The geodetic data include surface gradient information and surface elevation information for a third subset of the surface locations, and the set of constraining relationships includes the surface gradient information and surface elevation information for the third subset of the surface locations. Each of multiple undetermined values are included in multiple different constraining relationships. Each of the constraining relationships that includes multiple undetermined values, taken by itself, constrains without determining the undetermined values in the relationship.

Additionally or alternatively, implementations may include one or more of the following features. The set of constraining relationships includes a system of linear relationships. Identifying the particular surface gradient values (i.e., the particular values for the temporal changes in surface gradient) for the first subset of locations and the particular surface elevation values (i.e., the particular values for the temporal changes in surface elevation) for the second subset of locations includes solving the system of linear relationships for the particular surface gradient values and the particular surface elevation values. Generating the set of constraining relationships includes generating one or more matrices. Solving the set of constraining relationships includes inverting one or more of the matrices. Identifying the particular surface elevation values and the particular surface gradient values includes solving the set of constraining relationships based on Gaussian elimination or Gauss-Jordan elimination.

Additionally or alternatively, implementations may include one or more of the following features. The geodetic data include surface coordinate information for each of the surface locations. Neighboring pairs of the surface locations are identified based on the surface coordinates. The neighboring pairs of surface locations are identified based on generating a Delaunay triangulation of the surface locations. The Delaunay triangulation includes Delaunay connecting lines between each of the neighboring pairs of surface locations. Each of the constraining relationships is based on the geodetic data for a neighboring pair of the surface locations.

Additionally or alternatively, implementations may include one or more of the following features. A constraining relationship constrains the values of the changes in surface gradients at a neighboring pair of surface locations to values that result in a minimum surface curvature between the neighboring pair of locations. A constraining relationship constrains the values of the changes in surface elevations at a neighboring pair of surface locations to a lowest order change in elevation. The distance between a pair of surface locations may be represented as l based on the surface coordinates of the surface locations. For each neighboring pair of surface locations where the geodetic data include a value $t_1$ for a temporal change in surface gradient at a first point in the neighboring pair and a value $t_2$ for a temporal change in surface gradient at a second point in the neighboring pair, the set of constraining relationships constrains an undetermined value $h_1$ for a temporal change in surface elevation at the first point and an undetermined value $h_2$ for a temporal change in surface elevation at the second point by a relationship of the form $h_2-h_1=\frac{1}{2}(t_1+t_2)l$. For each neighboring pair where the geodetic data include a value h1 for a temporal change in surface elevation at a first point in the neighboring pair and a value $t_2$ for a temporal change in surface gradient at a second point in the neighboring pair, the set of constraining relationships constrains an undetermined value $t_1$ for a temporal change in surface gradient at the first point and an undetermined value $h_2$ for a temporal change in surface elevation at the second point by a relationship of the form $2h_2 - t_1 l = 2h_1 + t_2 l$. For each neighboring pair where the geodetic data include a value $h_1$ for a temporal change in surface elevation at a first point in the neighboring pair and a value $h_2$ for a temporal change in surface elevation at a second point in the neighboring pair, the set of constraining relationships constrains an undetermined value $t_1$ for a temporal change in surface gradient at the first point and an undetermined value $t_2$ for a temporal change in surface gradient at the second point by a relationship of the form $$t_1 + t_2 = \frac{2}{l}(h_1 - h_2).$$

Additionally or alternatively, implementations may include one or more of the following features. Parameters of elevation curves between the neighboring pairs of surface locations are determined based on the received geodetic data, the particular surface gradient values (i.e., the particular values for the temporal changes in surface gradient at the first subset of surface locations), and the particular surface elevation values (i.e., the particular values for the temporal changes in surface elevation at the second subset of surface locations). Each elevation curve represents a surface deformation between a neighboring pair of surface locations. The surface locations correspond to a region on the Earth's surface, and the method further includes calculating temporal changes in elevation for other surface locations in the region based on the parameters of one or more of the elevation curves. Determining the parameters of the elevation curves includes generating particular values of coefficients for terms of polynomial elevation curves. The polynomial elevation curves can include third order polynomials. The particular values of the coefficients for the terms of the polynomial elevation curves correspond to a minimum curvature surface. The particular values of the coefficients correspond to a unique minimum curvature surface for the particular surface gradient values, the particular surface elevation values, and measured elevation and gradient values in the geodetic data. A graphical representation of geographical surface deformation can be generated based on the polynomial elevation curves. The geographical surface deformation can represent a change in the shape of the geographic surface over a specified time period. The geographical surface deformation can be correlated with field activities associated with the geographic region and the time period.

Additionally or alternatively, implementations may include one or more of the following features. The geodetic data may be stored in a database, and one or more of the operations may be performed by data processing apparatus. A measurement subsystem may acquire the geodetic data for multiple measurement locations that correspond to the surface locations represented in the geodetic data. The measurement subsystem includes a tiltmeter array that generates the surface gradient information. The measurement subsystem includes a GPS and/or an InSAR system that generates the surface elevation information. One or more of the surface locations corresponds to a measurement location of a tiltmeter station. One or more of the surface locations corresponds to a measurement location of a GPS receiver and/or a measurement location of an InSAR system. The surface gradient measurements may include tiltmeter data from a tiltmeter array in an area in a geographic region, and the surface elevation measurements may include InSAR data for another area outside a perimeter of the tiltmeter array.

Additionally or alternatively, implementations may include one or more of the following features. The geodetic data include geodetic data for a plurality of time periods. A set of constraining relationships is generated for each of the plurality of time periods. The constraining relationship for each time period is solved to identify temporal changes in surface elevation and/or temporal changes in surface gradient for the time period. Models of geographic surface deformation are generated for each time period.

One or more implementations of the subject matter described in this specification can be implemented so as to realize one or more of the following advantages. A surface model may be generated in less time and in a deterministic manner. For example, one or more of the techniques described herein may be used to generate a minimum curvature surface faster than would be generated using some conventional techniques that rely on stochastic algorithms. Increased calculation speed may allow calculations to be performed at a finer time scale, so that solutions can be presented closer to real time and with greater temporal detail. As such, increased calculation speed may allow more precise correlation of surface deformation to field activities. A surface model may be generated based on geodetic data that includes only surface elevation information or only surface gradient information for multiple surface locations. For example, one or more of the disclosed techniques may be used to generate a minimum curvature surface based on geodetic data that includes InSAR data for surface locations outside of a geographic region covered by a tiltmeter array. Integration of tiltmeter data with InSAR data outside the tiltmeter array may allow more comprehensive analysis of surface deformation beyond comparing the tiltmeter solution with the InSAR-derived measurements.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1A:
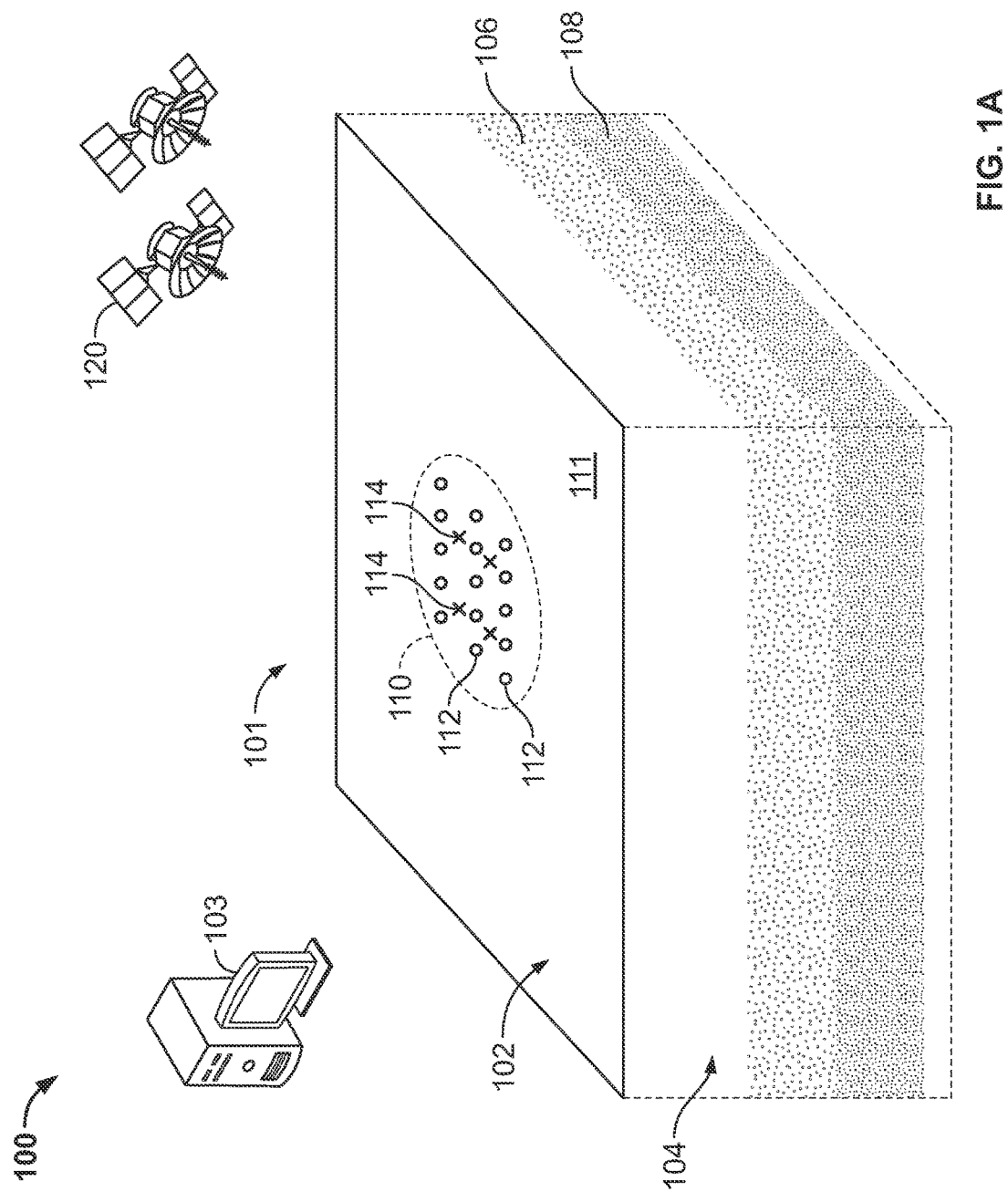
FIG. 1A is a schematic diagram showing an example surface evaluation system.

FIG. 1A is a schematic diagram showing an example surface evaluation system 100. The example surface evaluation system 100 in FIG. 1A includes a measurement subsystem 101 and a computing subsystem 103. In some implementations, a surface evaluation system may include additional and/or different features, components and/or subsystems. At a high level, the measurement subsystem 101 performs measurements to acquire information about a geographic surface 111 in a geographic region 102, and the information acquired by the measurement subsystem 101 is processed by the computing subsystem 103 to evaluate, analyze, and/or model aspects of the geographic region 102. In some instances, the components and subsystems of the surface evaluation system 100 may perform additional and/or different types of functions.

In some implementations, the computing subsystem 103 can calculate the smoothest possible surface from measurements of surface elevation, measurements of surface gradient, and/or measurements of both surface elevation and surface gradient at each surface location. Some conventional techniques require elevation and gradient information at every surface location. Such conventional techniques typically do not incorporate InSAR data from surface regions substantially outside the tiltmeter array. Such conventional techniques utilize stochastic algorithms that can be time consuming and indeterminate in that subsequent iterations can produce different results. The computing subsystem 103 may deterministically generate a minimum curvature surface based on InSAR data, tiltmeter data, and GPS data for multiple surface locations in any combination, which may include data points having only surface elevation data, only surface gradient data, or both elevation and gradient data. The computing subsystem 103 may generate a solution faster than some conventional systems. In some instances, an infinite number of different surfaces could theoretically be fit to a set of surface elevation and surface gradient measurements, and it may be desirable to generate a fit having a substantially minimum curvature. For example, it may be desirable to generate the surface that exhibits the lowest curvature and corresponds to the least complicated surface that satisfies the measurements. In some instances, the curvature of a surface can be estimated by summing the curvatures of the elevation curves defining the surface.

The geographic region 102 includes a geographic surface 111 and a subterranean region 104 beneath the surface 111. The subterranean region 104 may include various layers of rock and/or other structures. Two example layers 106, 108 are shown in FIG. 1A for purposes of illustration. Generally, the subterranean region 104 may include any number of layers and/or other types of geological features, which may have any topographical shape, thickness, and/or geometry. For example, the subterranean region 104 may include one or more rock layer having various degrees of porosity, permeability, and/or conductivity, and the subterranean structures may include faults, fractures, fissures, and/or other types of natural or induced discontinuities. In some implementations, the subterranean region 104 may contain hydrocarbon resources (e.g., natural gas, oil, coal, etc.), brine water, and/or other types of resources in a reservoir. For example, a subterranean reservoir may include conventional and/or non-conventional reservoirs.

In some implementations, the geographic region 102 includes all or part of one or more wells (not shown). For example, a well system in the geographic region 102 may include one or more discovery wells, monitoring wells, injection wells, production wells, and/or other types of wells. A well system may include a single well bore or multiple well bores, which may include well bores having vertical, horizontal, slant, curved, and/or other types of geometries. The subterranean region 104 may include fluids injected through one or more injection wells and/or induced fractures generated by the fluid injection. In some instances, one or more sensors or other measurement devices may be installed in a well bore. As such, the measurement subsystem 101 may include one or more downhole components located in a well bore beneath the surface 111.

The measurement subsystem 101 includes tiltmeter stations 112 in a tiltmeter array on the geographic surface 111, GPS receivers 114 in a GPS network on the geographic surface 111, and remote InSAR telemetry satellites 120. A measurement subsystem 101 may include additional and/or different components, measurement devices, subsystems, and/or other features. For example, the measurement subsystem 101 may include other types of measurement systems, such as, for example, aerial InSAR, laser ranging, laser leveling, land surveying, and/or other types of systems. The components of the measurement subsystem 101 may be arranged and/or configured in the manner shown or in a different manner. For example, a measurement subsystem may generally include any number of tiltmeter stations 112, any number of GPS receivers 114, and/or other types of measurement devices in any type of geometric or schematic arrangement.

Each of the GPS receivers 114 receives signals from GPS satellites and acquires three-dimensional surface coordinate measurements. For example, each of the GPS receivers 114 may acquire a position measurement periodically, based on predetermined events, based on command signals, and/or based on other criteria. The GPS measurements may indicate a surface elevation at the locations of the GPS receivers 114. The position measurements provided by the GPS receivers 114 may include three independent spatial coordinates, a time coordinate and/or other information. For example, the position measurements may indicate surface elevations and surface coordinates (e.g., longitudinal and latitudinal coordinates) for each of the surface locations of the GPS receivers 114. GPS measurements for two different time points may indicate a measured temporal change in elevation at a given surface location.

The InSAR satellites 120 and/or an airborne InSAR system use line-of-sight telemetry to acquire three-dimensional surface measurements. For example, InSAR data from one or more look directions may be used to generate three-dimensional surface measurements. The InSAR satellites 120 transmit electromagnetic signals that interact with the surface 111. At least a portion of the signals are reflected from the surface 111 and received by the satellites 120, and the received signals may be used to generate measurements of surface elevation changes over time for one or more locations on the surface 111. InSAR measurements may be acquired periodically, based on predetermined events, based on command signals, and/or based on other criteria. The InSAR measurements may indicate surface elevations changes over time at any surface location for which the InSAR satellites or airborne InSAR systems can acquire a line-of-sight measurement. The measurements provided by InSAR systems may include three independent spatial coordinates, one or more coordinates and/or other information. For example, the position measurements may indicate temporal changes in surface elevations and surface coordinates (e.g., longitudinal and latitudinal coordinates) for various locations on the surface 111.

The tiltmeter stations 112 acquire surface gradient measurements. The surface gradient measurements correspond to a temporal change in the slope or "tilt" of the geographic surface 111 at the location of the tiltmeter station 112. The surface gradient can be represented as a unitless quantity that indicates the vertical change of elevation over a lateral distance, and/or the surface gradient can be represented as an angular quantity that indicates the surface angle with respect to one or more reference directions. The surface gradient may be a vector quantity that includes a directional component. For example, a tiltmeter station may measure a surface gradient in the "North" direction, a surface gradient in the "East" direction, and/or a surface gradient in one or more other directions. Each of the tiltmeter stations 112 may acquire a gradient measurement periodically, based on predetermined events, based on command signals, and/or based on other criteria. The gradient measurements provided by the tiltmeter stations 112 may include surface location coordinates, one or more surface gradient values and an identification of the gradient directions, one or more time coordinates and/or other information. For example, the gradient measurements may indicate surface gradient magnitudes, surface gradient directions, a time period for the measurement, and surface coordinates (e.g., longitudinal and latitudinal coordinates) for the surface locations of the tiltmeter stations 112. Tiltmeter measurements may indicate a measured temporal change in surface gradient at a given surface location.

In the example shown in FIG. 1A, the tiltmeter stations 112 and the GPS receivers 114 reside in a region 110 on the geographic surface 111. The GPS receivers 114 may be interspersed between the tiltmeter stations 112. Thus, the GPS receivers 114 may acquire surface elevation data for a first set of surface locations, and the tiltmeter stations 112 may acquire surface gradient data for a second, different set of surface locations. In some implementations, one or more of the GPS receivers 114 may reside substantially in the same location with a tiltmeter station 112. Thus, a GPS receiver 114 and a tiltmeter station may acquire surface elevation data and surface gradient data for substantially the same surface location. In some implementations, one or more of the GPS receivers 114 may reside substantially apart from the tiltmeter array, for example, outside the region 110. The region 110 can be a region of any size, shape, or geometry. In some cases, the tiltmeter stations 112 and/or the GPS receivers 114 extend over an area ranging from 0.1 to 0.3 square miles, and in some cases the region can be smaller (e.g., less than 0.1 square mile) or larger (e.g., up to two square miles, or larger).

Generally, the measurement subsystem 101 may include any number of tiltmeter stations 112 and GPS receivers 114. In some example implementations, the region 110 on the geographic surface 111 may include twenty (20) to two hundred (200) tiltmeter stations 112 and two (2) to five (5) GPS receivers 114. In some implementations, GPS receivers 114 are not used. In some implementations, the measurement system 100 includes a greater number of tiltmeter stations 112 and/or a greater number of GPS receivers 114. In some implementations, the tiltmeter stations 112 and/or the GPS receivers 114 are organized generally in a grid arrangement on the surface 111. In some implementations, the tiltmeter stations 112 and/or the GPS receivers 114 are arranged in a different manner (e.g., radial, linear, random, and/or other types of patterns). The locations of the tiltmeter stations 112 and/or the GPS receivers 114 may be selected based on locations of geographic features, locations of subterranean features, locations of other infrastructure and communications equipment, and/or other factors. Data may be collected from some or all of the surface locations at the same time or at multiple different times.

In some instances, the InSAR satellites 120 can collect elevation data over substantially all of the geographic surface 111. For example, the InSAR satellites 120 may collect elevation data at surface locations inside the region 110, and the InSAR satellites 120 may collect elevation data at additional surface locations outside the perimeter of the tiltmeter array. As such, the elevation data generated by the measurement subsystem 101 may include surface elevation information for a large number data points inside and outside the tiltmeter array. Thus, the geodetic data generated by the measurement subsystem 101 may include surface elevation information without surface gradient information for one or more locations on the surface 111, surface gradient information without surface elevation information for one or more locations on the surface 111, both surface elevation information and surface gradient information for one or more locations on the surface 111, including any combination.

The measurement subsystem 101 measures temporal changes of the geographic surface 111. For example, surface elevation information provided by the measurement subsystem 101 may include measurements of temporal changes in surface elevation (e.g., based on measurements by the GPS receivers 114, the InSAR satellites 120, and/or other measurement devices), and surface gradient information provided by the measurement subsystem 101 may include measurements of temporal changes in surface gradient (e.g., based on measurements by the tiltmeter stations 112, and/or other measurement devices). Temporal changes may be measured over any time period. In some instances, each measurement device measures temporal changes of the geographic surface 111 over periods seconds, minutes, hours, days, weeks, months, years, or a combination of these. Temporal changes may be monitored during a time period associated with field activities (e.g., before, during, and/or after the field activities) to observe the effects of the field activities on the geographic surface 111, if any. A temporal change in surface elevation indicates a relationship between the surface elevation for two different points in time and does not necessarily indicate a difference in the surface elevation at the two points in time. That is to say, in some instances, the measured temporal change in surface elevation can be zero. Similarly, a temporal change in surface gradient indicates a relationship between the surface gradient for two different points in time and does not necessarily indicate a difference in the surface gradient at the two points in time. That is to say, in some instances, the measured temporal change in surface gradient can be zero.

The computing subsystem 103 includes data processing systems, devices, and/or components that can store and process information acquired by the measurement subsystem 101. For example, the computing subsystem 103 may include the example computing system 500 shown in FIG. 5 and/or additional or different types of systems and devices. The structure and operation of the example computing system 500 is discussed in more detail with respect to FIG. 5 below. The computing subsystem 103 may include multiple components in a single location and/or in multiple different locations. Some or all components of the computing subsystem 103 may be located remotely from the geographic region 102 and/or the computing subsystem 103 may include components located at or near the measurement system 102 in the geographic region 102.

The computing subsystem 103 may include and/or interact with communication systems and infrastructure. For example, the computing subsystem 103 may interact with one or more data networks (e.g., the Internet, a private data network, etc.), telecommunication networks, wired or wireless communication links, and/or other types of interfaces to receive measurement data from the measurement subsystem 101. In some implementations, some or all of the measurement data and/or related information may be delivered to the computing subsystem 103 on a computer-readable medium, such as, for example, a disk, a disk drive, a portable memory device, and/or another type of device.

The computing subsystem 103 may include computer software, applications, modules, codes, functions and/or other types of computer programs that evaluate the surface data provided by the measurement subsystem 101. For example, the computing subsystem 103 may analyze surface data by performing one or more of the operations in the process 300 shown in FIG. 3. In some example implementations, the computing subsystem 103 processes the geodetic data and generates elevation curves along connecting lines between data points corresponding to the locations of the surface measurements.

Figure 1B:
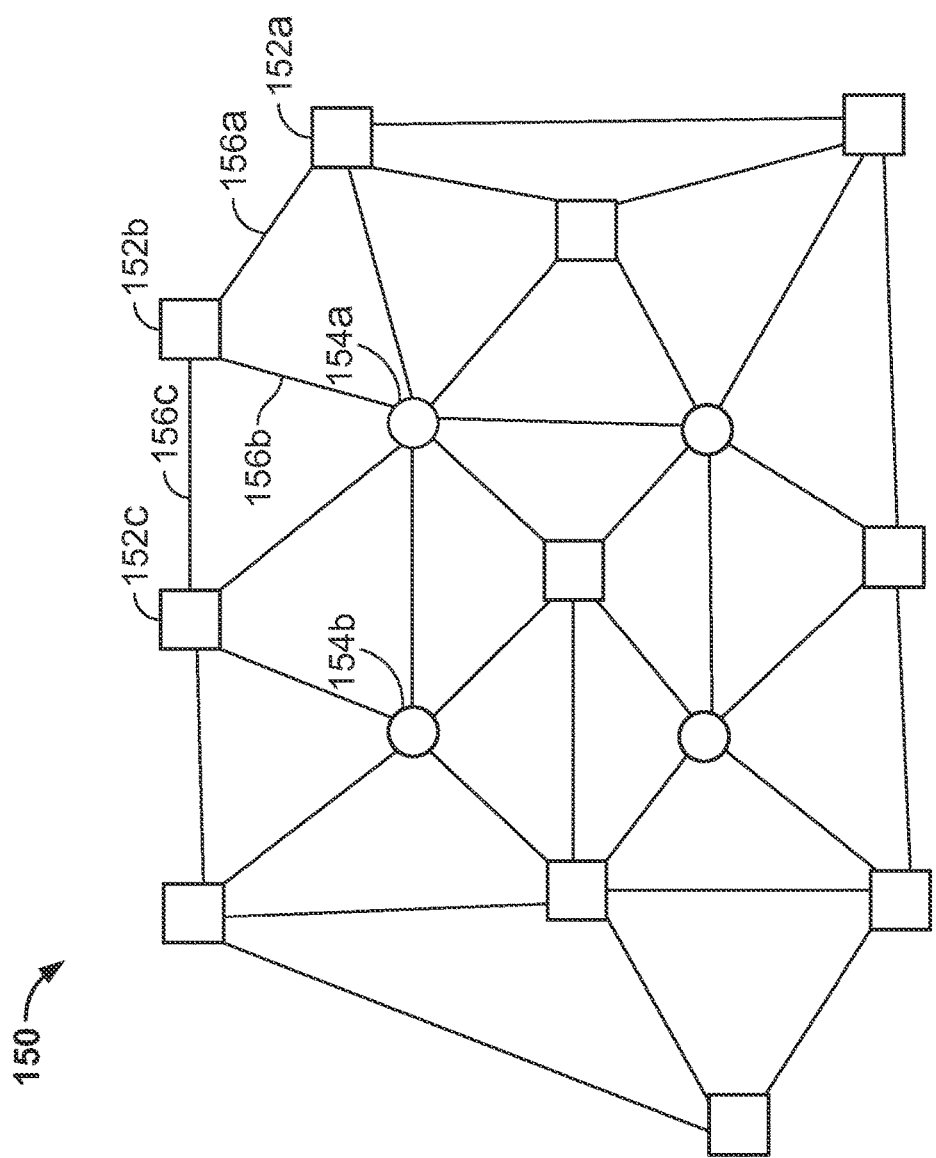
FIG. 1B is a schematic diagram showing example geodetic data points and connecting lines generated by the surface evaluation system 100 shown in FIG. 1A.

FIG. 1B is a schematic diagram 150 showing example geodetic data points and connecting lines that may be generated by the surface evaluation system 100 shown in FIG. 1A. The squares in the diagram 150 represent example surface elevation data points that correspond to surface locations for which surface elevation information is acquired by the measurement subsystem 101 (e.g., by the GPS receivers 114, by the InSAR satellites 120, etc.). The circles in the diagram 150 represent example surface gradient data points that correspond to locations for which surface gradient information is acquired by the measurement subsystem 101. Three of the surface elevation data points 152a, 152b, 152c and two of the surface gradient data points 154a, 154b are labeled in the diagram 150. The geodetic data points may correspond to measurement locations on the geographic surface 111 for which surface gradient information and/or surface elevation information has been acquired by the measurement subsystem 101.

The computing subsystem 103 may receive the geodetic data points as input data and generate connecting lines between pairs of the data points. In some implementations, the connecting lines may correspond to Delaunay lines generated by a Delaunay triangulation of the data points. The connecting lines may be generated by additional and/or different techniques. Three example connecting lines 156a, 156b, and 156c are shown in the diagram 150. The computing subsystem 103 may generate a surface elevation curve for each of the connecting lines in the diagram 150. The surface elevation curve represents the surface deformation over time at surface locations along the connecting line. The surface elevation curve between two data points may be generated based partially on values of surface elevation temporal changes and surface gradient temporal changes at the two data points.

Because, at least in some instances (as shown, for example, in FIG. 1B), the geodetic data received from the measurement subsystem 101 does not include both elevation and gradient information for all of the surface locations, the computing subsystem 103 may calculate surface elevation values (i.e., temporal changes in surface elevation) for the surface locations where the measurement subsystem 101 did not measure a surface elevation (e.g., surface gradient data points 154a, 154b, etc.), and/or the computing subsystem 103 may calculate surface gradient values (i.e., temporal changes in surface gradient) for the surface locations where the measurement subsystem 101 did not measure a surface gradient (e.g., surface elevation data points 156a, 156b, 156c, etc.). The unmeasured values may be calculated by solving a system of constraining equations, where the constraining equations are generated based on relationships between neighboring pairs of the surface locations. The system of constraining equations may include undetermined variables for the surface elevation or surface gradient at some or all of the surface locations. The constraining equations may be designed to generate values that yield the minimum curvature surface based on a given set of data inputs. Example constraining equations are discussed in more detail below with regard to FIGS. 2 and 3.

After the elevation and gradient values have been identified for the surface locations, the computing subsystem 103 may use the elevation and gradient values at each pair of data points to calculate parameters of the elevation curve along the connecting line between the data points. For example, the elevation and gradient values may be used to generate coefficients for the terms of a third order polynomial along each connecting line. In some instances, the solution is a set of elevation curves corresponding to a minimum curvature surface. Examples of calculating parameters of the elevation curves between the data points are discussed in more detail below with regard to FIGS. 2 and 3. The elevation curves may be used to calculate elevation, surface curvature, and/or other properties at additional locations on the surface. For example, the elevation curves may be interpolated to a Cartesian grid or another predefined set of points to generate a surface model. The surface model represents the deformation of the surface over a time period. Temporal changes represented in the surface may be used to analyze subterranean resources and structures. For example, movement of the Earth's surface may indicate movement of fluids, seismic behavior and/or other types of events in the layers 106, 108 beneath the Earth's surface.

Figure 2:
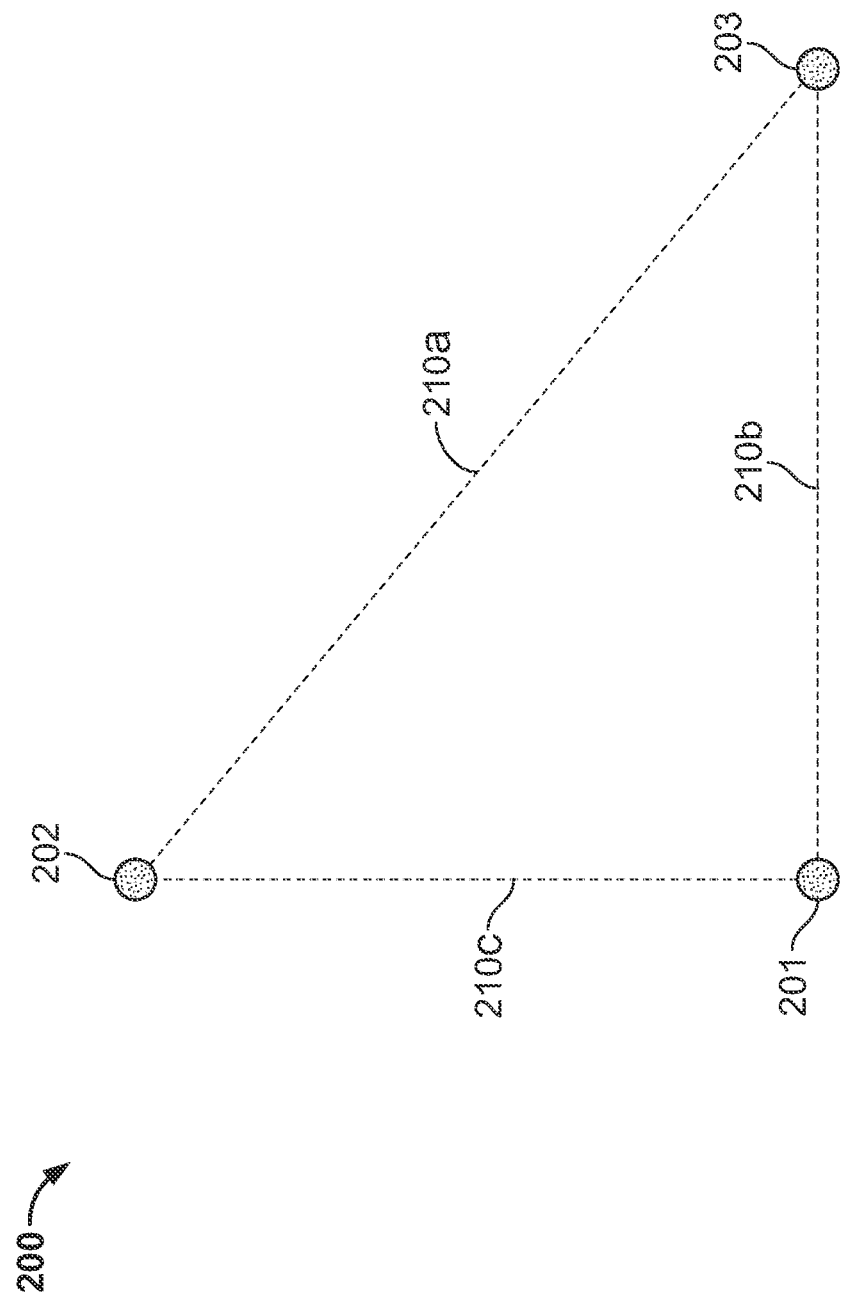
FIG. 2 is a schematic diagram showing example geodetic data points and connecting lines.

FIG. 2 is a schematic diagram showing example geodetic data points 201, 202, 203 and connecting lines 210a, 210b, 210c. The data points 201, 202, 203 may correspond to measurements generated by the measurement subsystem 101 for three surface locations on the geographic surface 111. The connecting lines 210a, 210b, 210c may correspond to Delaunay lines generated by Delaunay triangulation of the surface locations. For purposes of explanation, two example scenarios are discussed below with reference to FIG. 2. The techniques described for analyzing the two example scenarios may be expanded to additional and/or different scenarios, which may include substantially any number of surface locations and substantially any number of connecting lines. For example, the techniques described for analyzing the two example scenarios may be expanded to find the minimum curvature surface (i.e., the smoothest surface) given a number of data points over an area, where some points have an input surface gradient measurement, some points have an input surface elevation measurement, and some points have input elevation and gradient measurements.

In a first scenario, all three of the geodetic data points 201, 202, 203 have a measured gradient (i.e., measurements of temporal changes in the surface gradients over a given time period). In this scenario, the data point 203 can be used as a reference elevation. For a spline fit having a continuous second derivative, a curve of the form $$h = ax^3 + bx^2 + cx + d \quad (1)$$

may be assigned to each of the connecting lines 210a, 210b, 210c, where the variable h represents the temporal elevation change along the connecting line over the given time period and the variable x represents the distance along the line between x=0 at one of the data points and x=1 at the other data point. The measured temporal changes in the surface gradient (represented by the variables $t_1$, $t_2$, and $t_3$ for the data points 201, 202, 203 respectively) at the ends of each line relate to the coefficients a, b and c from Equation 1 according to the first order derivative of the elevation change h with respect to x:

$$\frac{dh}{dx} = 3ax^2 + 2bx + c. \qquad (2)$$

For an initial estimate, in the first scenario, there is insufficient information to determine all three coefficients, so the lowest order spline may be used by assuming a=0. In some instances, other assumptions may be useful. Evaluating Equation 2 at the boundary values of x yields:

$$\left.\frac{dh}{dx}\right|_{x=0} = c = t_1 \qquad (3)$$

and $$\left.\frac{dh}{dx}\right|_{x=l} = 2bl + t_1 = t_2. \qquad (4)$$

From Equations 3 and 4, the elevation curve of Equation 1 may be expressed $$h = \frac{t_1 - t_2}{2l}x^2 + t_1 x + d. \qquad (5)$$

Along each of the connecting lines, Equation 5 provides the lowest order height calculation. The lowest order height difference for the connecting line 210c between data points 201 and 202 is provided by the constraining equation:

$$h_1 - h_2 = \frac{(t_1 + t_2)}{2}l, \qquad (6)$$

which is equivalent to the average of the gradient measurements multiplied by length of the connecting line. Constraining equations can be generated for the other connecting lines 210a, 210b, and the constraining equations for each connecting line can be expressed in matrix form, where each column of the matrix represents one of the measurement points and each row represents one of the connecting lines:

$$\begin{bmatrix} -1 & 1 & 0 \\ -1 & 0 & 1 \\ 0 & -1 & 1 \end{bmatrix} \begin{bmatrix} h_1 \\ h_2 \\ h_3 \end{bmatrix} = \left(\frac{1}{2}\right) \begin{bmatrix} (t_{2C} + t_{1C})l_C \\ (t_{3B} + t_{1B})l_B \\ (t_{3A} + t_{2A})l_A \end{bmatrix}. \qquad (7)$$

In Equation 7 above, the variables $h_1$, $h_2$, and $h_3$ represent the undetermined values for the temporal changes in the surface elevations at the data points 201, 202, 203 respectively; the variables $l_A$, $l_B$, and $l_C$ represent the lengths of the connecting lines 210a, 210b, 210c respectively; the variable $t_{1C}$ represent the temporal change in surface gradient at data point 201 along the direction of connecting line 201c; the variable $t_{1B}$ represent the temporal change in surface gradient at data point 201 along the direction of connecting line 210b; the variable $t_{2A}$ represent the temporal change in surface gradient at data point 202 along the direction of connecting line 210a; the variable $t_{2C}$ represent the temporal change in surface gradient at data point 202 along the direction of connecting line 210c; the variable $t_{3A}$ represent the temporal change in surface gradient at data point 203 along the direction of connecting line 210a; the variable $t_{3B}$ represent the temporal change in surface gradient at data point 203 along the direction of connecting line 210b. In Equation 7, the variables on the right hand side have known values indicated by the measured geodetic data. Because the left side matrix has rank 2, the matrix cannot be inverted. In this scenario, incorporating a measured value or an assumed reference value of the elevation for the data point 203 converts the three-by-three matrix in Equation 7 to a matrix that has a rank 2. For example, assuming $h_3$=0 eliminates the third column of the left side matrix, and Equation 7 reduces to:

$$\begin{bmatrix} -1 & 1 \\ -1 & 0 \\ 0 & 1 \end{bmatrix} \begin{bmatrix} h_1 \\ h_2 \end{bmatrix} = \left(\frac{1}{2}\right) \begin{bmatrix} (t_{2C} + t_{1C})l_C \\ (t_{3B} + t_{1B})l_B \\ (t_{3A} + t_{2A})l_A \end{bmatrix} \qquad (8)$$

The changes in elevation ($h_1$ and $h_2$) at points 201 and 202 may be calculated by solving Equation 8. For example, ($h_1$ and $h_2$) may be calculated as $$\begin{bmatrix} h_1 \\ h_2 \end{bmatrix} = \begin{bmatrix} -1 & 1 \\ -1 & 0 \\ 0 & 1 \end{bmatrix} \backslash \left(\frac{1}{2}\right) \begin{bmatrix} (t_{2C} + t_{1C})l_C \\ (t_{3B} + t_{1B})l_B \\ (t_{3A} + t_{2A})l_A \end{bmatrix} \qquad (9)$$

where the '\' in Equation 9 represents a pseudo-inverse operator that uses Gaussian elimination to find the least squares solution. Generally, a matrix equation such as Equation 8 may be solved based on inverting the left-most matrix in the equation. Gaussian elimination and Gauss-Jordan elimination are examples of well-known techniques that generate the least squares solution to the matrix equation. These techniques and/or other techniques may be used to solve Equation 8.

Once the elevation changes at the tiltmeter locations are evaluated using the least squares solution, the undetermined coefficients (a, b, c, d) in Equation 1 can be calculated, for example, based on Equations 2, 3, 4, and 5 above. For connecting line 210a, Equation 1 becomes $$h_A = \left(\frac{(t_{2A} + t_{3A})}{l_A^2} - \frac{2(h_3 - h_2)}{l_A^3}\right)x^3 + \left(\frac{3(h_3 - h_2)}{l_A^2} - \frac{t_{3A} + 2t_{2A}}{l_A}\right)x^2 + t_{2A}x + h_2 \qquad (10)$$

Equation 1 may be converted to a similar elevation curve equation for connecting lines 210b and 210c in the first scenario.

Moving to a second scenario, instead of using the assumption $h_3$=0, the second scenario assumes the data point 203 has a measured value for the temporal change in elevation and an undetermined gradient value. In other words, in the second scenario, only two of the geodetic data points 201, 202 have a measured surface gradient movement, and only one of the data points 203 has a measured surface elevation movement. In the example analysis for this second scenario, calculations are similar to the calculations in the first scenario, except that the gradient is not measured at data point 203 and elevation of point 203 is measured. The temporal change in the surface gradient at point 203 is represented by undetermined values $t_{3E}$ and $t_{3N}$ corresponding to the surface gradient in the East and North directions, respectively. In the example shown in FIG. 2, only two connecting lines 210a, 210b converge at point 203, so the gradients of the two line connecting lines 210a, 210b can be considered independent. In many practical cases, there will be a greater number of lines converging at many of the elevation data points. Beginning with the equations:

$$\begin{bmatrix} -1 & 1 & 0 \\ -1 & 0 & 1 \\ 0 & -1 & 1 \end{bmatrix} \begin{bmatrix} h_1 \\ h_2 \\ h_3 \end{bmatrix} = \left(\frac{1}{2}\right) \begin{bmatrix} (t_{2C} + t_{1C})l_C \\ (t_{3B} + t_{1B})l_B \\ (t_{3A} + t_{2A})l_A \end{bmatrix} \quad (11)$$

The matrix equation can be extended to account for the measured value of the elevation change $h_3$ and the undetermined values $t_{3E}$ and $t_{3N}$ for the gradient:

$$\begin{bmatrix} -1 & 1 & 0 & 0 \\ -1 & 0 & \frac{-l_B}{2}\sin\theta_{3B} & \frac{-l_B}{2}\cos\theta_{3B} \\ 0 & -1 & \frac{-l_A}{2}\sin\theta_{3A} & \frac{-l_A}{2}\cos\theta_{3A} \end{bmatrix} \begin{bmatrix} h_1 \\ h_2 \\ t_{3E} \\ t_{3N} \end{bmatrix} = \left(\frac{1}{2}\right) \begin{bmatrix} (t_{2C} + t_{1C})l_C \\ t_{1B}l_B + 2h_3 \\ t_{2A}l_A - 2h_3 \end{bmatrix} \quad (12)$$

In Equation 12, $\theta_{3A}$ represents the angle of the connecting line 210a at point 203 relative to North, and $\theta_{3B}$ represents the angle of the connecting line 210b at point 203 relative to North. The left side matrix has a rank less than 4, so the solution cannot be uniquely calculated. However, in many situations, the matrix will have enough linearly independent rows to allow calculation of a unique least squares fit. For situations where this is not the case, as here, one option is to further simplify the gradient at the point of measured elevation change, for example, by assuming $t_{3A} = t_{2A}$ and $t_{3B} = t_{1B}$. This simplifies the matrix equation to:

$$\begin{bmatrix} -1 & 1 \\ -1 & 0 \\ 0 & -1 \end{bmatrix} \begin{bmatrix} h_1 \\ h_2 \end{bmatrix} = \left(\frac{1}{2}\right) \begin{bmatrix} (t_{2C} + t_{1C})l_C \\ t_{1B}l_B + 2h_3 \\ t_{2A}l_A - 2h_3 \end{bmatrix} \quad (13)$$

This simplification acknowledges that the input data does not have a unique solution, so the gradient at the elevation site reverts to the lowest possible curvature, and the remainder of the solution is calculated from there. Additional and/or different simplifications may be made in this situation and/or in similar or different situations.

The techniques described with respect to FIG. 2 for these two example scenarios may be expanded to handle substantially any set of data points. For example, the matrices above may be expanded with additional rows and columns to accommodate tens, hundreds, or thousands of surface locations and connecting lines, and any corresponding undetermined variables.

Figure 3:
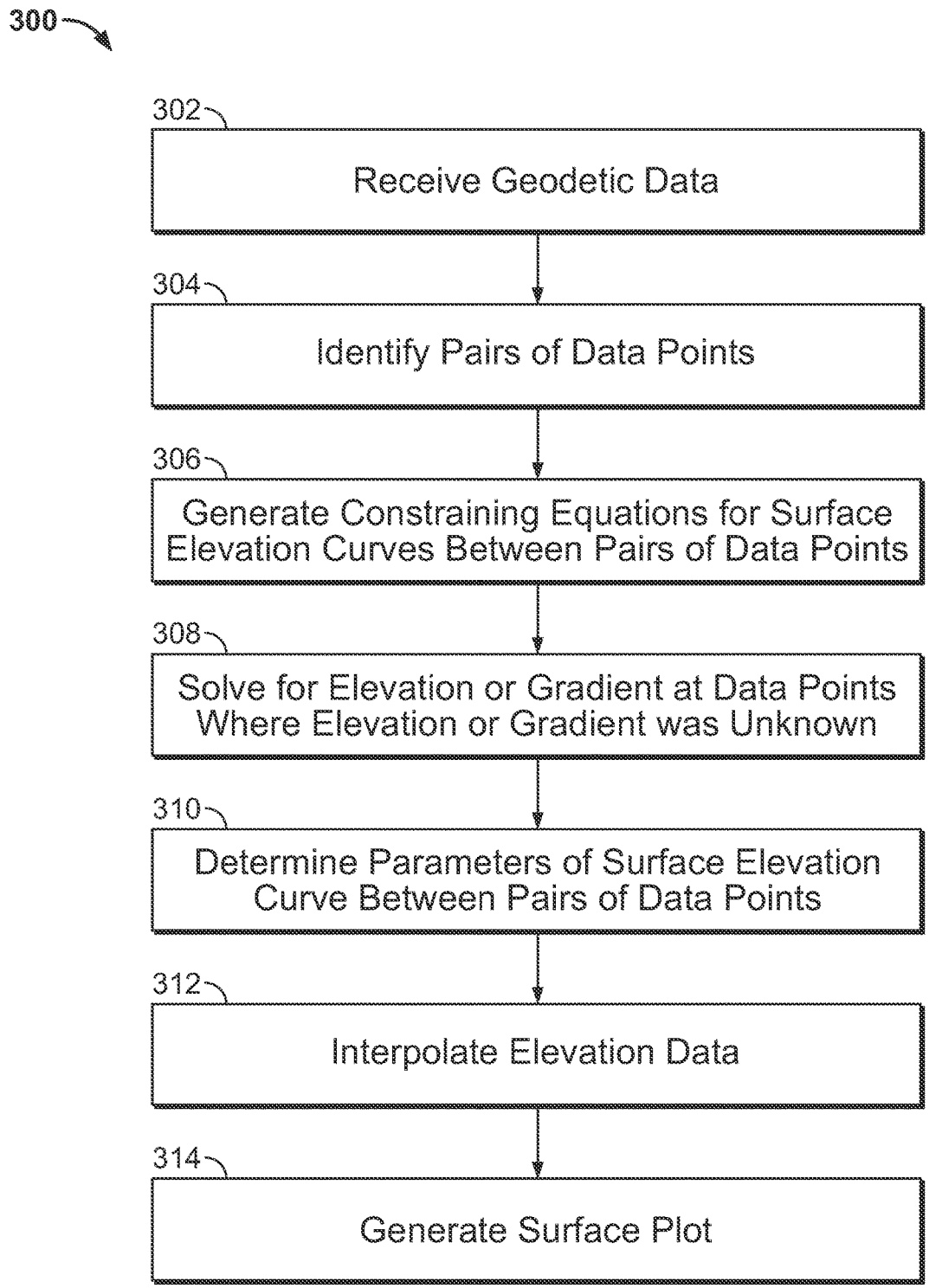
FIG. 3 is a flow chart showing an example process for evaluating surface data.

FIG. 3 is a flow chart showing an example process 300 for evaluating surface data. For example, the process 300 may be used to evaluate geodetic data collected by the measurement subsystem 101 in FIG. 1. In some implementations, the process 300 may include additional, fewer, and/or different operations performed in the order shown or in a different order. Moreover, one or more of the individual operations and/or subsets of the operations in the process 300 can be performed in isolation and/or in different contexts to achieve a similar or different result. In some implementations, one or more of the operations in the process 300 may be iterated, repeated, omitted, modified, and/or performed by multiple sub-operations. Some or all aspects of the process 300 may be implemented by data processing apparatus executing computer-readable instructions, which may be included in one or more software programs, modules, or applications configured to provide the functionality described. While the process 300 is discussed in terms of determining values of temporal changes in elevation and/or temporal changes in gradient for a time period based on measurements of temporal changes in elevation and/or temporal changes in gradient for the time period, the process 300 may be used to calculate surface elevations and/or surface gradients for a given time point based on elevation measurements and/or gradient measurements for the given time point.

In some implementations, the process 300 provides a deterministic calculation of a minimum curvature surface. For example, the process 300 may be implemented such that the same output is always generated given the same set of input geodetic measurements. A deterministic approach may be executed faster, for example, compared to some stochastic approaches that generate a statistically meaningful number of separate solutions and average them together. While a deterministic approach may have certain advantages in some implementations, stochastic techniques may also be useful. In some implementations, the process 300 uses a least squares fit and/or related mathematical techniques to calculate surface elevations and/or surface gradients. As such, the process 300 may inherently provide uncertainty estimates based on how well the least squares solution fits the calculated lowest order curvature estimates.

At 302, geodetic data are received. For example, input data can be received from a local memory, from a remote device, and/or in a different manner. The geodetic data may include surface elevation information, surface gradient information, or a combination of surface elevation information and surface gradient information at each of multiple surface locations. Each of the surface locations may correspond to a measurement location where a measurement was acquired. For example, the geodetic data may include tiltmeter data, InSAR data, GPS data, and/or other types of data. The geodetic data may include measurements of temporal changes in surface elevations and/or measurements of temporal changes in surface gradients over a particular time period (e.g., an hour, a week, a month, a year, and/or another time period) and/or over multiple time periods.

At 304, pairs of data points are identified. Neighboring pairs of data points may be identified by finding a set of Delaunay lines linking each of the measurement sites. Delaunay lines may be identified by any triangulation technique. Delaunay triangulation is an example of a conventional triangulation technique that, given a discrete set of surface coordinates, generates connecting lines among neighboring pairs of surface coordinates. The set of connecting lines form triangles having vertices at the surface coordinates. The Delaunay triangulation technique, in some instances, maximizes the minimum angle of all the angles of the triangles in the triangulation. The pairs of data points may be identified by generating a triangulation that satisfies the so-called "Delaunay condition" that no triangle defines a circumcircle that encompasses another data point in the triangulation. A Delaunay triangulation may be generated based on a two-dimensional set of coplanar data points. A two-dimensional Delaunay triangulation may be generated based on data points at different elevations by projecting the data points onto a plane (or other two-dimensional surface), for example, based on coordinates of longitude and latitude. In some instances, a Delaunay triangulation can be generated in three-dimensions based on a three-dimensional set of non-coplanar data points. In some instances, one or more of the Delaunay lines may be selectively ignored or thrown out, for example, based on the angular density or proximity of the Delaunay lines. Additional and/or different techniques may be used to identify the pairs of data points.

An elevation function may be assigned to each pair of data points. The elevation function between a pair of data points may represent the temporal deformation of the surface between the data points during the time period that the change in elevation and/or change in gradient was measured at one or both of the two data points. For example, the elevation function can be a third order polynomial $h=ax^3+bx^2+cx+d$, where the variable h represents the temporal change in elevation at each point along a path between the data points, the variable x represents the distance along the path between the data points. The coefficients a, b, c, and d for the elevation function assigned to each pair of data points may initially be undetermined. The third order polynomial describes a spline that may ensure continuous first and second derivatives of the surface elevation. Additional and/or different types of elevation functions may be used.

At 306, constraining equations for surface elevation curves between the pairs of data points are generated. For example, the constraining equations may be represented in matrix form and/or as another type of data object. A set of constraining equations may relate undetermined values for surface gradients (i.e., temporal changes in surface gradients) and/or undetermined values for surface elevations (i.e., temporal changes in surface elevations) to measurements of surface elevation movement and/or measurements of surface gradient movement in the received geodetic data. Equations 8 and 12 above provide two example sets of constraining relationships for three example surface locations. Some or all of the constraining equations can include multiple undetermined values. Equation 6 above is an example of an individual constraining equation with multiple undetermined elevation values ($h_1$ and $h_2$) and multiple measured values ($t_1$ and $t_2$). A constraining equation may additionally or alternatively include undetermined gradient values and/or measured elevation values in any combination. For a constraining equation that includes multiple undetermined values, the equation constrains the values of each variable with respect to the values of the other variables without independently rendering the variables determinate. That is to say, a constraining equation may constrain without determining unmeasured values. Each of the constraining equations are typically generated based on a pair of the data points. As such, the set of constraining equations may include an individual constraining equation for each pair of data points. In some instances, constraining equations are generated for fewer than all of the pairs.

A constraining equation for a pair of surface locations may relate undetermined values for surface elevations (i.e., undetermined temporal changes in the surface elevations) at the surface locations to measured surface gradient values (i.e., measured temporal changes in the surface gradients) at the surface locations. In some implementations, for pairs of data points where the surface gradient is known at both ends, the known surface gradient values may be used to generate the lowest order change in elevation along the line connecting the data points. For example, for a neighboring pair of surface locations having surface coordinates separated by a distance l, where the geodetic data include a surface gradient value $t_1$ for a first point in the neighboring pair and a surface gradient value $t_2$ for a second point in the neighboring pair, a constraining equation may constrain an undetermined surface elevation value $h_1$ for the first point and an undetermined surface elevation value $h_2$ for the second point by an equation of the form $h_2-h_1=\frac{1}{2}(t_1+t_2)/l$.

A constraining equation for a pair of surface locations may relate undetermined values for surface gradients (i.e., undetermined temporal changes in the surface gradients) at the surface locations to measured surface elevation values (i.e., measured temporal changes in the surface elevations) at the surface locations. In some implementations, for pairs of data points where the surface elevation is known at both ends, the known surface elevation values may be used to generate the local surface gradient that results in a minimum curvature surface. For example, for a neighboring pair of surface locations having surface coordinates separated by a distance l, where the geodetic data include a surface elevation value $h_1$ for a first point in the neighboring pair and a surface elevation value $h_2$ for a second point in the neighboring pair, a constraining equation may constrain an undetermined surface gradient value $t_1$ for the first point and an undetermined surface gradient value $t_2$ for the second point by an equation of the form $$t_1 + t_2 = \frac{2}{l}(h_1 - h_2).$$

A constraining equation for a pair of surface locations may relate an undetermined value for a surface gradient (i.e., an undetermined temporal changes in the surface gradient) at a first surface location and an undetermined value for a surface elevation (i.e., an undetermined temporal change in surface elevation) at a second surface location to a measured surface elevation value (i.e., a measured temporal change in the surface elevation) at the first surface location and measured surface gradient value (i.e., a measured temporal change in the surface gradient) at the second surface location. In some implementations, for pairs of data points where the surface elevation is known at one end and the surface gradient is known at the other end, the known surface gradient value and the known surface elevation value may be used to generate a constraining equation of the form $2h_2-t_1l=2h_1+t_2l$. For example, for a neighboring pair of surface locations having surface coordinates separated by a distance l, where the geodetic data include a surface elevation value $h_1$ for a first point in the neighboring pair and a surface gradient value $t_2$ for a second point in the neighboring pair, a constraining equation may constrain an unknown surface gradient value $t_1$ for the first point and an unknown surface elevation value $h_2$ for the second point by an equation of the form $2h_2-t_1l=2h_1+t_2l$.

In these and other scenarios, additional and/or different types of constraining equation may be used. The gradient values in a constraining equation may be separated into multiple different terms each having angular dependencies that represent the directional nature of the gradient. For example, the gradient values may be divided into multiple components each representing the surface gradient along a particular connecting line based on geometric or trigonometric relationships among the connecting lines. An example is provided in Equation 12 above. An equation for a pair of data points may, in some instances, have only one undetermined value.

At 308, the constraining equations are solved to identify surface elevation values (i.e., temporal changes in the surface elevation) and/or surface gradient values (i.e., temporal changes in the surface gradient) at the data points where the surface elevation and/or surface gradient was unknown. For example, the set of constraining equations developed at 306 may be solved using a least squares method that generates particular surface elevation values for each measurement location where the surface elevation was not measured and/or particular surface gradient values for each measurement location where the surface gradient was not measured. When the set of constraining equations is represented in matrix form, the least squares solution may be generated, for example, by Gaussian elimination, by the Gauss-Jordan technique, and/or other techniques for solving a system of linear equations.

At 310, parameters of surface elevation curves between the pairs of data points are determined. For example, with the particular elevation changes and the particular gradient changes generated based on the constraining equations, the coefficients (a, b, c, d) of the third order polynomial may be uniquely determined for the connecting lines between some or all pairs of data points. With particular values for the coefficients of each elevation curve, the temporal change in elevation at any point along any of the connecting line may be calculated. The resulting elevation curves may be uniquely determined by the elevation and gradient values determined at 308. In other words, the elevation and gradient values determined at 308 may correspond to a single minimum curvature surface for the elevation lines between the neighboring pairs of data points. The curvature of a surface can be estimated by summing the curvatures of each of the triangulation lines between pairs of data points.

Figure 4A:
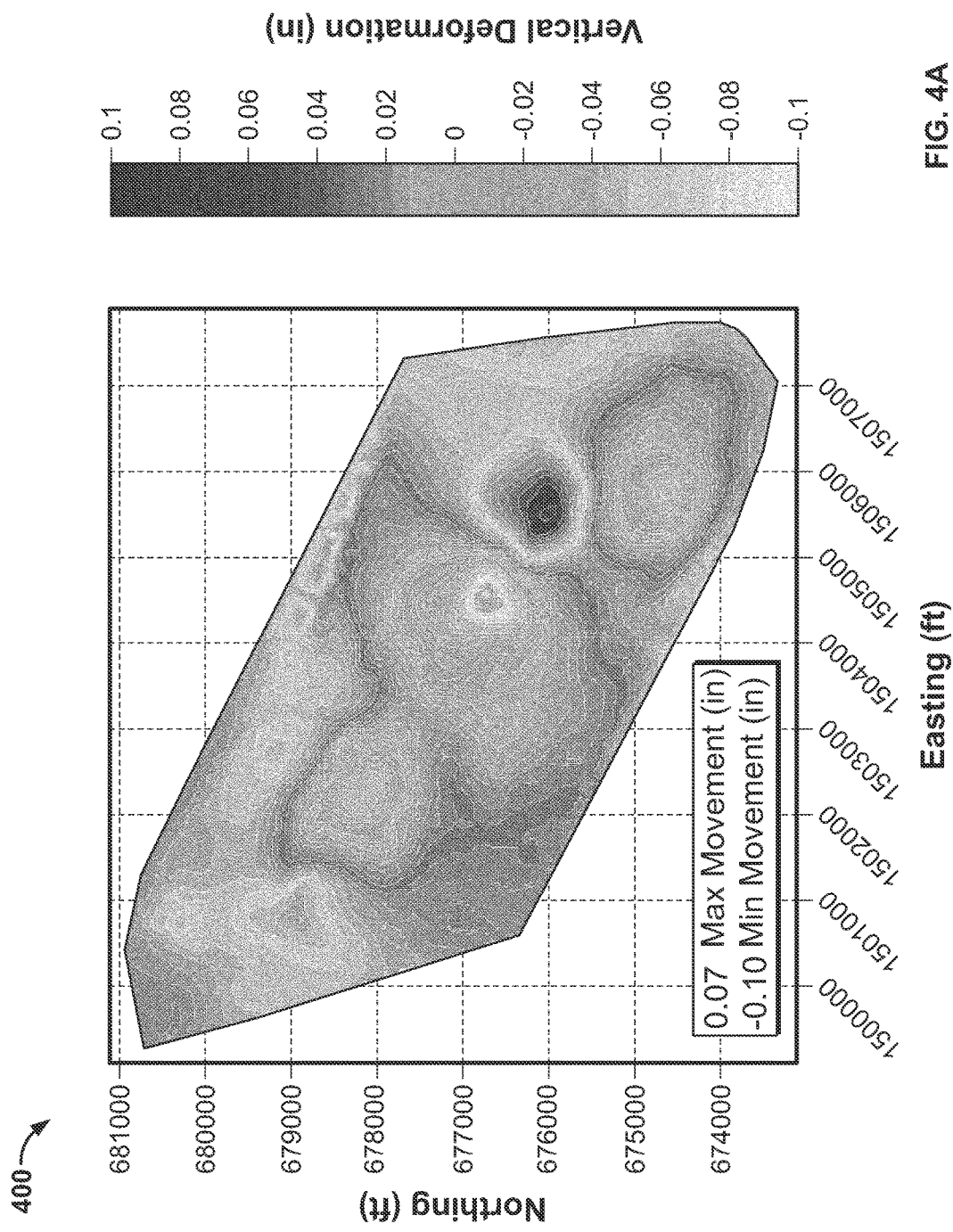
FIGS. 4A and 4B are diagrams showing example surface deformation models.
Figure 4B:
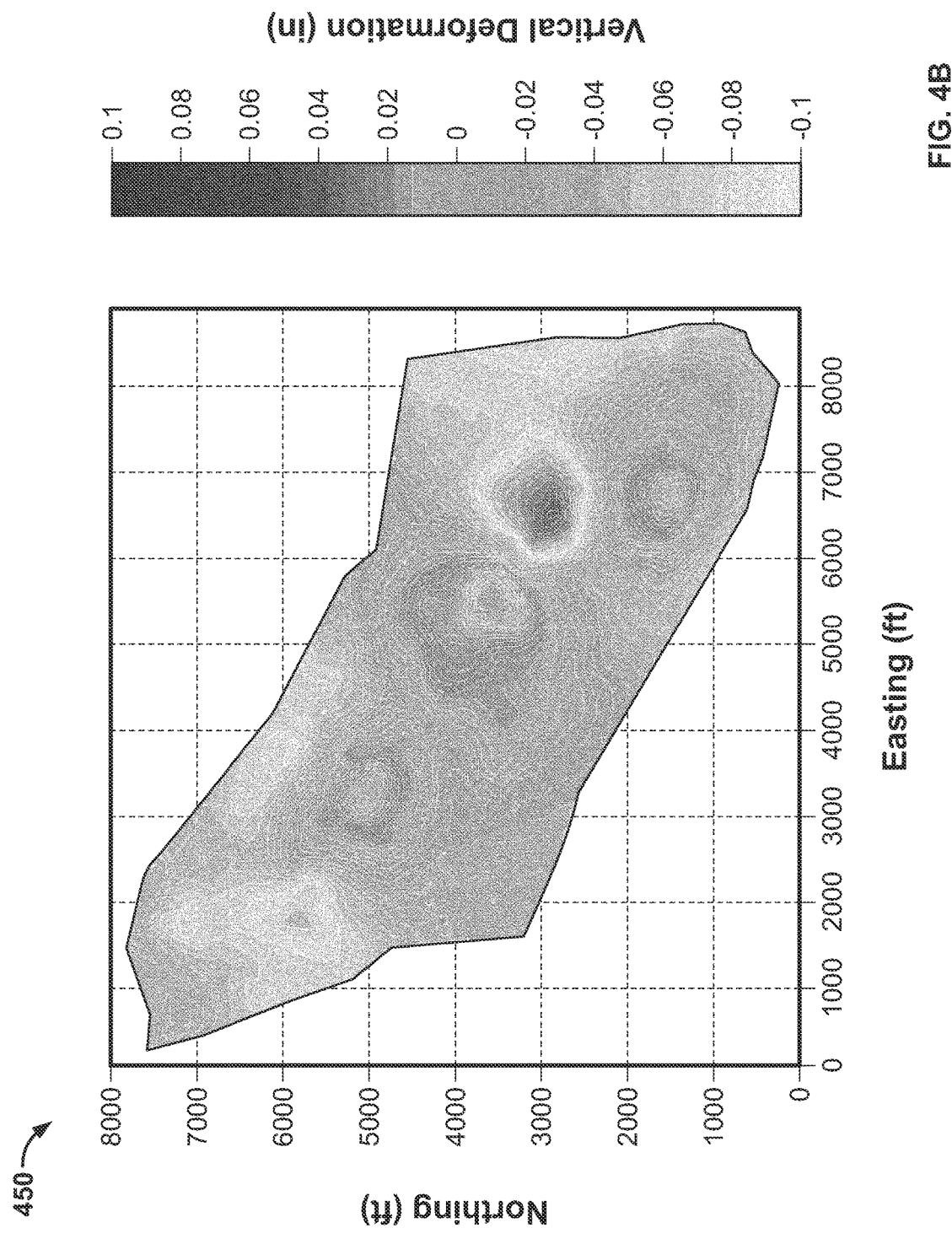

At 312, the elevation data are interpolated. The coefficients generated at 310 may be used to interpolate elevation along the connecting lines, for example, to a desired grid and/or other locations. The elevations at the grid locations may represent a numerical model of the surface deformation. At 314, a surface plot is generated. For example, the surface model generated at 312 may be rendered on display device, a plotter, a printing device, and/or some other medium. FIGS. 4A and 4B are diagrams showing example surface models that indicate deformation of an example geographic surface over a time period of one day. Additional and/or different time periods may be used. FIG. 4A shows an example surface model 400 that represents a geographical surface generated according to the example process 300 described above. FIG. 4B shows another example surface model 450 that represents a geographical surface. In the surface model 450 in FIG. 4B, external Delaunay triangles having an angle below a specified limit have been removed. This allows concave external hull shapes in the arrays, and removes regions where the interpolation of elevation may be invalid.

In some implementations, the surface models generated for each time period can be analyzed to identify movement and/or deformation of the geographical surface. The movement and/or deformation of the geographical surface and/or other observed events may be time-correlated with field activities. For example, surface deformation may be correlated with fracturing activities, production activities, drilling activities, and/or other activities in or near the geographic region. In other examples, surface deformation may be used to analyze seismic events and/or movement of geological structures in or near the subterranean region under the surface. The process 300 may be performed in a relatively short amount of time so that the surface models may be presented and/or analyzed closer to real time and with greater temporal detail. As such, increased calculation speed may allow more precise correlation of surface deformation to field activities, more precise analysis of subterranean events, and/or other advantages.

Figure 5:
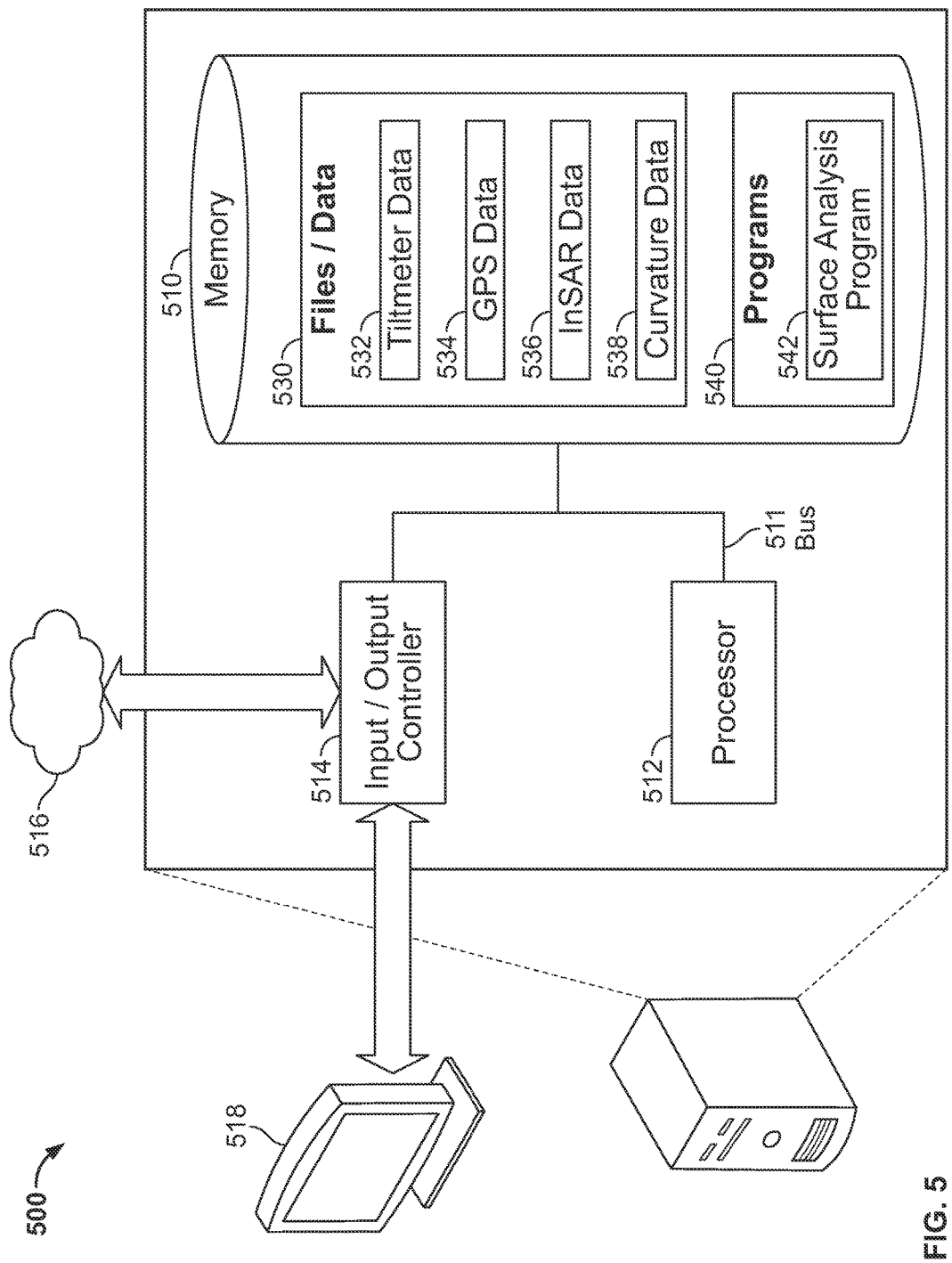
FIG. 5 is a schematic diagram showing aspects of an example computing system.

FIG. 5 is a diagram showing aspects of an example computing system 500. One or more structural or operational aspects of the computing subsystem 103 in FIG. 1A may be implemented by the example computing system 500, which may operate in coordination with one or more other computing systems in additional and/or different locations. In some instances, the example computing system 500 may perform one or more operations of the example process 300 shown in FIG. 3. In some instances, the computing subsystem 500 may generate one or more of the graphical models shown in FIGS. 4A and 4B. The computing subsystem 500 may include additional and/or different components and may be configured to operate in a different manner.

The example computing system 500 includes a processor 512, a memory 510, and input/output controllers 514 communicably coupled by a bus 511. The memory 510 can include, for example, a random access memory (RAM), a storage device (e.g., a writable read-only memory (ROM) and/or others), a hard disk, and/or another type of storage medium. The computing system 500 can be preprogrammed and/or it can be programmed (and reprogrammed) by loading a program from another source (e.g., from a CD-ROM, from another computer device through a data network, and/or in another manner). The input/output controller 514 is coupled to input/output devices (e.g., a monitor 518, a mouse, a keyboard, and/or other input/output devices) and to a network 516. The input/output devices receive and transmit data in analog or digital form over communication links such as a serial link, wireless link (e.g., infrared, radio frequency, and/or others), parallel link, and/or another type of link.

The network 516 can include any type of data communication network. For example, the network 516 can include a wireless and/or a wired network, a Local Area Network (LAN), a Wide Area Network (WAN), a private network, a public network (such as the Internet), a WiFi network, a network that includes a satellite link, and/or another type of data communication network.

The memory 510 can store instructions (e.g., computer code) associated with an operating system, computer applications, and/or other resources. The memory 510 can also store application data and data objects that can be interpreted by one or more applications and/or virtual machines running on the computing system 500. As shown in FIG. 5, the example memory 510 includes data 530 and programs 540. In some implementations, a memory of a computing device may include some or all of the information shown in the example memory 510. The memory 510 may store additional information, for example, files and instruction associated with an operating system, device drivers, archival data, and/or other types of information.

The files and data on the memory 510 include information relating to surface evaluation such as, for example, geodetic data that includes surface elevation information and/or surface gradient information for multiple surface locations in a geographic region. The information stored in the memory 510 may include and/or may be derived from data collected by a remote measurement system, for example, a tiltmeter array, GPS receivers, an InSAR system, and/or others. In the example shown, the memory 510 stores tiltmeter data 532, GPS data 534, InSAR data 536, and curvature data 538. The memory 510 may store additional and/or different types of information relating to surface elevation.

The tiltmeter data 532, GPS data 534, and InSAR data 536 may include geodetic data received from, and/or generated based on measurements taken by, the measurement subsystem 101 in FIG. 1. For example, the tiltmeter data 532 may include surface gradient information generated by one or more tiltmeter stations 112; the GPS data 534 may include surface elevation data generated by one or more of the GPS receivers 114; and the InSAR data 536 may include surface elevation information generated by the InSAR satellites 120. The geodetic data may include geodetic data for multiple different geographical regions, as well as geodetic data for multiple different time periods and/or multiple different surface locations in a given geographical region. For example, the tiltmeter data 532 may include two-dimensional surface coordinates (e.g., longitude and latitude coordinates) indicating surface locations of tiltmeters that acquired data points included in the tiltmeter data 532, and/or the tiltmeter data 532 may include time data (e.g., relative or absolute time coordinates) for each data point indicating times when the data were acquired and/or indicating a time periods over which temporal change were observed. Similarly, the GPS data 534, the InSAR data 536, and/or other types of geodetic data may include surface coordinate data and/or time data for each data point. The geodetic data may include additional and/or different information. In some instances, the geodetic data include information on a measurement uncertainty or error bars for each measurement. In some instances, the geodetic data include a serial number, identifier and/or other information on the measurement apparatus that acquired the data. For example, the geodetic data may include information that identifies the specific tiltmeter station or GPS receiver that generated the data.

The curvature data 538 may include surface information generated by the surface analysis program 542 based on geodetic measurements. For example, the curvature data 538 may include connecting lines for neighboring surface locations, surface elevation values, and/or surface gradient values generated by the surface analysis program 542 based on the tiltmeter data 532, the GPS data 534, the InSAR data 536, and/or other data. The curvature data 538 may include parameters of surface curves, for example, along connecting lines between neighboring surface locations. In some instances, the curvature data 538 may include parameters of a polynomial curve (e.g., second order, third order, etc.) between neighboring pairs of data points. The curvature data 538 may include models, diagrams, maps, plots, and/or other types of data that can be rendered to generate a visual representation of a geographical surface. For example, the curvature data 538 may include one or more of the surface models 400, 450 shown in FIGS. 4A and 4B, respectively. The curvature data 538 may include information on multiple different geographical regions, information on multiple different areas in a given geographic region, information on multiple different time points, and/or other types of information.

The programs 540 can include software applications, scripts, programs, functions, executables, and/or other modules that are interpreted and/or executed by the processor 512. In the example shown, the programs 540 includes a surface analysis program 542, which may include software applications, scripts, programs, functions, executables, and/ or other modules that operate alone or in combination as a surface evaluation tool. The surface analysis program 542 may include machine-readable instructions for performing one or more of the operations shown in FIG. 3. The programs 540, including the surface analysis program 542, can obtain input data, such as surface elevation information, surface gradient information, surface coordinate information, and/or other types of input data, from the memory 510, from another local source, and/or from one or more remote sources (e.g., via the network 516). The programs 540, including the surface analysis program 542, can generate output data, such as curvature data 538 and/or other types of output data, and store the output data in the memory 510, in another local medium, and/or in one or more remote devices (e.g., by sending the output data via the network 516).

The processor 512 can execute instructions, for example, to generate output data based on data inputs. For example, the processor 512 can run the programs 540 by executing and/or interpreting the software, scripts, functions, executables, and/or other modules contained in the programs 540. The processor 512 may perform one or more of the operations shown in FIG. 3. The input data received by the processor 512 and/or the output data generated by the processor 512 may include any of the tiltmeter data 532, the GPS data 534, the InSAR data 536, the curvature data 538, and/or other types of data.

Generally, the surface analysis program 542 can include high-level code, low-level code, source code, object code, machine code, or a combination of these and/or other types of code. The surface analysis program 542 may be written in C, C++, Perl, and/or other types of compiled, interpreted, or executable programming languages. In some example implementations, the surface analysis program 542 may include one or more functions or files (e.g., a ".m" file) that can be interpreted and/or executed by MATLAB® computational software, available from MATHWORKS®. Below are some example MATLAB® functions that may be included in a ".m" file and/or in multiple related ".m" files. The example MATLAB® functions can be executed using MATLAB® version 7.7. One or more of the instructions may invoke or otherwise use a MATLAB®-defined function and/or other conventional functions. In some implementations, one or more of the instructions, functions, and/or algorithms may be modified, and in some cases additional and/or different instructions, functions, or algorithms may be substituted. As such, the following MATLAB® functions provide an example of computer program code that may be used to implement aspects of one or more of the techniques disclosed herein. For example, one or more of the following MATLAB® functions may be used to perform one or more of the operations of the process 300 shown in FIG. 3. These and other aspects of the techniques disclosed herein may additionally or alternatively be implemented using different types of instructions, different types of codes, different types of formulae, different types of algorithms, and/or different types of data objects. The example MATLAB® functions below can be used together. That is to say, some of the instructions in the example MATLAB® functions below invoke one of the other example MATLAB® functions provided below. As such, the inputs and outputs for each function will be apparent from the context and the accompanying description below.

The following example MATLAB® function may be used to generate a surface deformation model based on geodetic data. This example function identifies parameters of fitted surface curves based on measurements of change in gradient and/or measurements of change in elevation for multiple measured surface locations over a given time period, and the example function generates an output matrix ("elev") that includes surface coordinates and values of temporal change in elevation for multiple points on a surface. The output elevation values correspond to a surface of minimum curvature. Additional and/or different techniques may be used. The example function may accept the following input data objects: "tiltvalues" is a matrix having n rows and four columns, where each row includes East and North tiltmeter surface coordinates, an East direction gradient value, and a North direction gradient value; "elevvalues" is a matrix having m rows and three columns, where each row includes East and North surface coordinates and an elevation change value; "zeropt" is an optional index to a row of the "tiltvalues" matrix to be used as a zero reference elevation; "small_angle_lim" is a value that selects Delaunay lines to be removed from the analysis, where Delaunay triangles with an angle less than small_angle_lim will have the longest side removed. The inputs "tiltvalues" and "elevvalues" may include measurement data from one or more geodetic measurement systems.

```
function elev = splinefit(tiltvalues,elevvalues,zsite,small_angle_lim)
if nargin == 0
   test_spline2;
   return;
end
pointsperline = 10;
diagnostics = false;
points = organize_inputs(tiltvalues,elevvalues,zsite);
triangles = delaunay(points.x,points.y);
if diagnostics
   openfigure('Delaunay');
   triplot(triangles,points.x,points.y);
   hold on;
   plot(points.x,points.y,'or')
end
line.ind = [triangles(:,1:2);triangles(:,2:3);[triangles(:,1) triangles(:,3)]];
line.ind = unique(sort(line.ind,2),'rows');
removeline = findsmallangles(triangles,points,small_angle_lim);
line.ind = setdiff(line.ind,removeline,'rows');
if diagnostics
   for k = 1:size(removeline,1)
      x = points.x(removeline(k,:));
      y = points.y(removeline(k,:));
      plot(x,y,'r-')
   end
end
line = get_line_param(points,line);
xypts = getxypts(line,points,pointsperline);
ideal_delta_h = low_order_spline(line);
[A,x] = elev_matrix(points,line);
i = ~all(A == 0,2);
A = A(i,:);
ideal_delta_h = ideal_delta_h(i);
[A,x,points,ideal_delta_h] = check_rank(A,x,points,ideal_delta_h,line);
solution = A\ideal_delta_h;
i = strcmp(x.source,'elev');
points.elev(x.ind(i)) = solution(i);
i = strcmp(x.source,'etilt');
points.etilt(x.ind(i)) = solution(i);
i = strcmp(x.source,'ntilt');
points.ntilt(x.ind(i)) = solution(i);
line.tilt = resolve_tilt(points,line);
xypts.elev = fit_curve(points,line,pointsperline);
elev = [xypts.x(:) xypts.y(:) xypts.elev(:)];
[temp,nonrepeat] = unique(elev(:,1:2),'rows');
elev = elev(nonrepeat,:);
```

The following example MATLAB® function may be used to organize input geodetic data for further processing. Additional and/or different techniques may be used.

```
function points = organize_inputs(tiltvalues,elevvalues,zsite)
dist_lim = .1;
tiltvalues = tiltvalues(~any(isnan(tiltvalues),2),:);
elevvalues = elevvalues(~any(isnan(elevvalues),2),:);
points.x = tiltvalues(:,1);
points.y = tiltvalues(:,2);
points.elev = NaN*zeros(size(points.x));
points.etilt = tiltvalues(:,3)/1e6;
points.ntilt = tiltvalues(:,4)/1e6;
points.elev(zsite) = 0;
if size(elevvalues,1) < 1
   return
end
for k = 1:numel(points.x)
   dist = trilength(tiltvalues(k,1:2),elevvalues(:,1:2));
   i = find(dist <= dist_lim);
   if numel(i) > 1
      showwarn('Multiple elevation points found close to a tilt point');
      [temp,i] = min(dist);
   end
   if numel(i) == 1
      points.elev(k) = elevvalues(i,3);
      elevvalues(i,:) = [ ];
   end
end
if size(elevvalues,1) < 1
   return
end
points.x    = [points.x;elevvalues(:,1)];
points.y    = [points.y;elevvalues(:,2)];
points.elev = [points.elev;elevvalues(:,3)];
points.etilt = [points.etilt;NaN*zeros(size(elevvalues,1),1)];
points.ntilt = [points.ntilt;NaN*zeros(size(elevvalues,1),1)];
```

The following example MATLAB® function may be used to remove one or more connecting lines based on angles between the connecting lines. Additional and/or different techniques may be used.

```
function removeline = findsmallangles(triangles,points,anglelimit)
xy = [points.x points.y];
a = trilength(xy(triangles(:,1),:),xy(triangles(:,2),:));
b = trilength(xy(triangles(:,2),:),xy(triangles(:,3),:));
c = trilength(xy(triangles(:,3),:),xy(triangles(:,1),:));
anglea = 180/pi * findangle(a,b,c);
angleb = 180/pi * findangle(b,a,c);
anglec = 180 - (anglea + angleb);
smalltri = find(any([anglea angleb anglec] <= anglelimit,2));
[temp,longside] = max([a(smalltri) b(smalltri) c(smalltri)],[ ],2);
removeline = zeros(numel(longside),2);
for k = 1:numel(longside)
   if longside(k) == 1,
      removeline(k,:) = triangles(smalltri(k),[1 2]);
   elseif longside(k) == 2,
      removeline(k,:) = triangles(smalltri(k),[2 3]);
   elseif longside(k) == 3,
      removeline(k,:) = triangles(smalltri(k),[1 3]);
   end
end
removeline = unique(sort(removeline,2),'rows');
```

The following example MATLAB® function may be used to find an angle based on the law of cosines. Additional and/or different techniques may be used.

```
function angle = findangle(a,b,c)
   angle = acos((c.^2 + b.^2 - a.^2)./(2*b.*c));
```

The following example MATLAB® function may be used to calculate the length of a connecting line between two surface locations. Additional and/or different techniques may be used.

```
function lng = trilength(p1,p2)
p1 = p1';
p2 = p2';
lng = sqrt((p1(1,:)- p2(1,:)).^2 + (p1(2,:) - p2(2,:)).^2)';
```

The following example MATLAB® function may be used to identify a gradient, elevation, length and/or orientation for one or more points on a connecting line between two surface locations. Additional and/or different techniques may be used.

```
function line = get_line_param(points,line)
dx = diff(points.x(line.ind),1,2);
dy = diff(points.y(line.ind),1,2);
line.theta = pi/2 - atan2(dy,dx);
line.tilt = resolve_tilt(points,line);
line. elev = points.elev(line.ind);
p1 = [points.x(line.ind(:,1)) points.y(line.ind(:,1))];
p2 = [points.x(line.ind(:,2)) points.y(line.ind(:,2))];
line.lng = trilength(p1,p2);
```

The following example MATLAB® function may be used to identify a gradient along a connecting line between two surface locations. Additional and/or different techniques may be used.

```
function tilt = resolve_tilt(points,line)
p1 = line.ind(:,1);
p2 = line.ind(:,2);
tilt_1 = ...
    points.etilt(p1).*sin(line.theta)+points.ntilt(p1).*cos(line.theta);
tilt_2 = ...
    points.etilt(p2).*sin(line.theta)+points.ntilt(p2).*cos(line.theta);
tilt = [tilt_1 tilt_2];
```

The following example MATLAB® function may be used to generate a constraining relationship for a pair of neighboring surface locations. Additional and/or different techniques may be used.

```
function delta_h = low_order_spline(line)
delta_h = NaN*ones(size(line.lng));
i = all(isnan(line.elev),2);
delta_h(i) = -mean(line.tilt(i,:),2).*line.lng(i);
i = ~any(isnan(line.elev),2);
delta_h(i) = -diff(line.elev(i,:),1,2);
i = isnan(line.elev(:,1)) & ...
    ~isnan(line.elev(:,2)) & isnan(line.tilt(:,2));
delta_h(i) = -line.tilt(i,1).*line.lng(i)/2 - line.elev(i,2);
i = isnan(line.elev(:,1)) & ...
    ~isnan(line.elev(:,2)) & ~isnan(line.tilt(:,2));
delta_h(i) = -mean(line.tilt(i,:),2).*line.lng(i) - line.elev(i,2);
i = ~isnan(line.elev(:,1)) & ...
    isnan(line.tilt(:,1)) & isnan(line.elev(:,2));
delta_h(i) = -line.tilt(i,2).*line.lng(i)/2 + line.elev(i,1);
i = ~isnan(line.elev(:,1)) & ...
    ~isnan(line.tilt(:,1)) & isnan(line.elev(:,2));
delta_h(i) = -mean(line.tilt(i,:),2).*line.lng(i);
```

The following example MATLAB® function may be used to generate a set of constraining relationships based on geodetic data. Additional and/or different techniques may be used.

```
function [A,x] = elev_matrix(points,line)
A = zeros(size(line.ind,1),numel(points.x));
x.source(1:size(A,2)) = {'elev'};
x.ind(1:size(A,2)) = 1:numel(points.elev);
for k = 1:numel(line.lng)
    A(k,line.ind(k,1)) = -1;
    A(k,line.ind(k,2)) = 1;
end
i = isnan(points.elev);
A = A(:,i);
x.source = x.source(i);
x.ind = x.ind(i);
i = find(~isnan(points.elev) & isnan(points.etilt));
orig_col = size(A,2);   % Active column of A;
A = [A zeros(size(A,1),2*numel(i))];
x.source = [x.source cell(1,2*numel(i))];
x.ind   = [x.ind zeros(1,2*numel(i))];
for k = 1:numel(i)
    rows = any(line.ind == i(k),2);
    col = orig_col + 1 + 2*(k-1);
    x.source(col:col+1) = {'etilt' 'ntilt'};
    x.ind(col:col+1) = i(k);
    A(rows,col) = line.lng(rows).*sin(line.theta(rows))/2;
    A(rows,col+1) = line.lng(rows).*cos(line.theta(rows))/2;
end
i = ~all(A == 0,1);
A = A(:,i);
x.source = x.source(i);
x.ind = x.ind(i);
```

The following example MATLAB® function may be used to determine if a matrix can be inverted and/or to interpolate an undetermined surface gradient at one or more surface locations, for example, to increase the rank of the matrix. Additional and/or different techniques may be used.

```
function [A,x,points,ideal_delta_h] = ...
            check_rank(A,x,points,ideal_delta_h,line)
if rank(A) >= size(A,2)
    return
end
reduce_count = 0;
while rank(A) < size(A,2)
    reduce_count = reduce_count + 1;
    col = find(strcmp(x.source,'etilt'),1);
    i = x.ind(col);
    conn_lines = any(line.ind == i,2);
    conn_pts = line.ind(conn_lines,:);
    conn_pts = conn_pts(conn_pts ~= i);
    theta = line.theta(conn_lines);
    Ap = [sin(theta) cos(theta)];
    line_tilt = line.tilt(conn_lines,:);
    line_lng = line.lng(conn_lines);
    Bp = NaN*zeros(sum(conn_lines),1);
    for k = 1:numel(Bp)
        if any(~isnan(line_tilt(k,:)))
            Bp(k) = line_tilt(k,~isnan(line_tilt(k,:)));
        elseif ~isnan(points.elev(conn_pts(k)))
            Bp(k) = (points.elev(i) - points.elev(conn_pts(k)))/line_lng(k);
        end
    end
    Ap = Ap(~isnan(Bp),:);
    Bp = Bp(~isnan(Bp));
    if rank(Ap) == size(Ap,2)
        tilt = Ap\Bp;
    else
        showwarn('Could not resolve tilt')
    end
    points.etilt(i) = tilt(1);
    points.ntilt(i) = tilt(2);
    ideal_delta_h = ideal_delta_h - A(:,col+[0 1])*tilt(:);
    keepindex = setdiff(1:size(A,2),col+[0 1]);
    A = A(:,keepindex);
    x.source = x.source(keepindex);
    x.ind = x.ind(keepindex);
    line.tilt = resolve_tilt(points,line);
end
if reduce_count == 1
    str = ['Interpolated tilt at ' num2str(reduce_count) ' location.'];
```

```
else
    str = ['Interpolated tilt at ' num2str(reduce_count) ' locations.'];
end
disp(['Inversion matrix was rank deficient.' str])
```

The following example MATLAB® function may be used to calculate points on an elevation curve between two surface locations. Additional and/or different techniques may be used.

```
function point_elev = fit_curve(points,line,pointsperline)
n = numel(line.lng);
end_elev = points.elev(line.ind);
alpha = zeros(n,4);
tilt = −line.tilt;
alpha(:,1) = (tilt(:,1) + tilt(:,2))./line.lng.^2 − ...
             2*diff(end_elev,1,2)./line.lng.^3;
alpha(:,2) = 3*diff(end_elev,1,2)./line.lng.^2 − ...
             (2*tilt(:,1) + tilt(:,2))./line.lng;
alpha(:,3) = tilt(:,1);
alpha(:,4) = end_elev(:,1);
point_elev = zeros(n,pointsperline);
for k = 1:n
    xval = linspace(0,line.lng(k),pointsperline);
    point_elev(k,:) = polyval3(alpha(k,:),xval);
end
```

The following example MATLAB® function may be used to calculate points on a third order polynomial elevation curve between two surface locations. Additional and/or different techniques may be used.

```
function out = polyval3(coeff,value)
out = coeff(1).*(value.^3) + coeff(2).*(value.^2) + ...
      coeff(3).*value + coeff(4);
```

The following example MATLAB® function may be used to calculate surface coordinates along a connecting line between two surface locations. Additional and/or different techniques may be used.

```
function xypts = getxypts(line,points,pointsperline)
numlines = size(line.ind,1);
xypts.x = zeros(numlines,pointsperline);
xypts.y = zeros(numlines,pointsperline);
xypts.elev = zeros(numlines,pointsperline);
for k = 1:numlines
    xypts.x(k,:) = linspace(points.x(line.ind(k,1)), ...
                   points.x(line.ind(k,2)),pointsperline);
    xypts.y(k,:) = linspace(points.y(line.ind(k,1)), ...
                   points.y(line.ind(k,2)),pointsperline);
end
```

Some aspects of the subject matter and the operations described in this specification can be implemented in digital electronic circuitry, or in computer software, firmware, or hardware, including the structures disclosed in this specification and their structural equivalents, or in combinations of one or more of them. Some aspects of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Aspects of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a Global Positioning System (GPS) receiver, or a portable storage device (e.g., a universal serial bus (USB) flash drive), and other types of devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, aspects of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Some aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described components and systems can generally be integrated together in a single product or packaged into multiple products.

In the present disclosure, "each" refers to each of multiple items or operations in a group, and may include a subset of the items or operations in the group and/or all of the items or operations in the group. In the present disclosure, the term "based on" indicates that an item or operation is based at least in part on one or more other items or operations—and may be based exclusively, partially, primarily, secondarily, directly, or indirectly on the one or more other items or operations.

A number of embodiments of the invention have been described. Nevertheless, it will be understood that various modifications may be made without departing from the spirit and scope of the invention. Accordingly, other embodiments are within the scope of the following claims.

What is claimed is:

1. A system comprising:
 a database that stores geodetic data associated with a geographic region, the geodetic data including surface gradient information for at least a subset of a plurality of surface locations in the geographic region, wherein the geodetic data comprise surface elevation information for a first subset of the surface locations and surface gradient information for a second subset of the surface locations; and
 a processor operable to perform operations including:
  generating a set of constraining relationships based on the geodetic data, the set of constraining relationships relates undetermined values for temporal changes in surface gradients at the first subset of surface locations and undetermined values for temporal changes in surface elevations at the second subset of surface locations to the surface elevation information and the surface gradient information included in the geodetic data, a plurality of the constraining relationships each include multiple undetermined values for multiple surface elevations; and
  identifying particular values for temporal changes in surface elevations at each surface location in the subset comprises identifying particular values for temporal changes in surface gradients for each of the first subset of locations and particular values for temporal changes in surface elevation each of the second subset of surface locations based on determining a solution to the set of constraining relationships.

2. The system of claim 1, further comprising a measurement subsystem that acquires the geodetic data for a plurality of measurement locations, each of the plurality of surface locations corresponding to one of the measurement locations.

3. The system of claim 2, the measurement subsystem comprising at least one of a Global Positioning System (GPS) or an Interferometric Synthetic Aperture Radar (InSAR) system that generates the surface elevation information, the surface elevation information including measurements of temporal changes in surface elevations at the first subset of surface locations.

4. The system of claim 2, the measurement subsystem comprising a tiltmeter array that generates the surface gradient information, the surface gradient information including measurements of temporal changes in surface gradients at the first subset of surface locations.

5. The system of claim 1, the operations further comprising generating a model of geographic surface deformation in the geographic region based on the received geodetic data and the particular values.

6. The system of claim 1, wherein the geodetic data include measurements of temporal changes in surface gradients over a plurality of time periods, wherein the processor is operable to perform operations further comprising:
generating a set of constraining relationships for each of the plurality of time periods; and
identifying particular values for temporal changes in surface elevations for the subset of surface locations for each time period based on determining a solution to the set of constraining relationships for each time period.

7. The system of claim 6, the operations further including generating models of geographic surface deformation for each time period; and
correlating temporal changes of the geographic surface with field activities associated with the geographic region.

8. The system of claim 7, the operations further including analyzing subterranean geological features based on the temporal changes of the geographic surface.

* * * * *

UNITED STATES PATENT AND TRADEMARK OFFICE
CERTIFICATE OF CORRECTION

PATENT NO. : 9,581,725 B2  
APPLICATION NO. : 14/220754  
DATED : February 28, 2017  
INVENTOR(S) : Eric J. David Page 1 of 1

It is certified that error appears in the above-identified patent and that said Letters Patent is hereby corrected as shown below:

In the Specification

Column 16, Line 8, delete formula "$h_2 - h_1 = 1/2(t_1 + t_2)/l$" and insert --$h_2 - h_1 = 1/2(t_1 + t_2)l$--

Signed and Sealed this  
Twentieth Day of February, 2018

Andrei Iancu  
*Director of the United States Patent and Trademark Office*